UNITED STATES PATENT OFFICE.

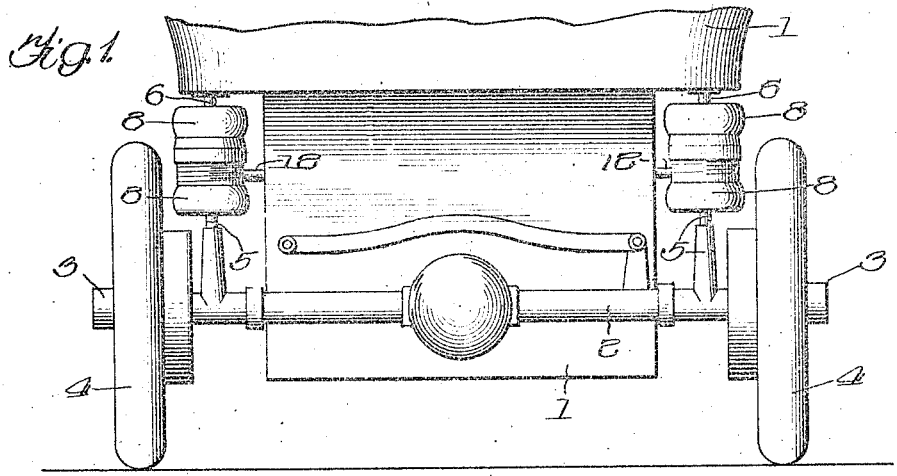
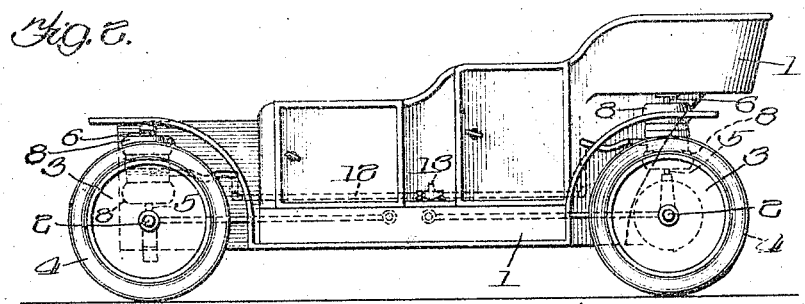
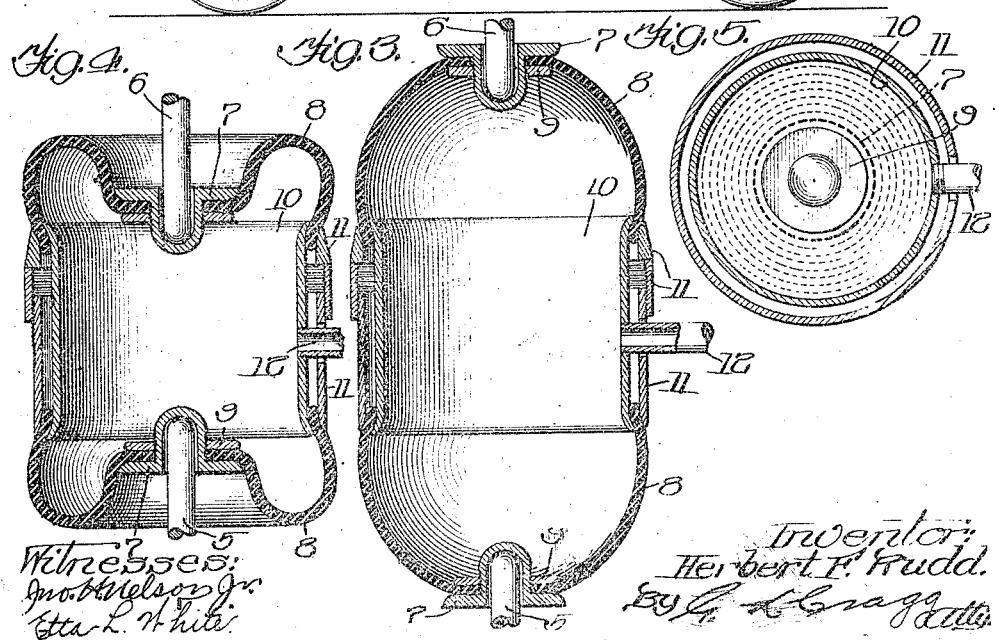

HERBERT F. RUDD, OF CHICAGO, ILLINOIS.

PNEUMATIC-CUSHION STRUCTURE.

1,177,142.  Specification of Letters Patent.  Patented Mar. 28, 1916.

Application filed January 31, 1913. Serial No. 745,351.

*To all whom it may concern:*

Be it known that I, HERBERT F. RUDD, a citizen of the United States, residing at Chicago, in the county of Cook and State of Illinois, have invented a certain new and useful Improvement in Pneumatic-Cushion Structures, of which the following is a full, clear, concise, and exact description, reference being had to the accompanying drawings, forming a part of this specification.

My invention relates to pneumatic cushions which may be of particular service in supporting vehicle bodies upon running gears although the invention is not to be restricted to this adaptation.

The various objects and advantages of my invention will be fully explained by reference to the accompanying drawing showing the preferred embodiment thereof, but to which embodiment the invention is not to be limited, and in which drawing—

Figure 1 is a rear elevation of the lower portion of an automobile equipped with the device of my invention; Fig. 2 is a side view of the automobile; Fig. 3 is a vertical sectional view of one cushion structure not under compression; Fig. 4 shows the structure of Fig. 3 under stress; and Fig. 5 is a horizontal sectional view taken at the mid portion of a cushion structure.

Like parts are indicated by similar characters of reference throughout the different figures.

I have shown an automobile vehicle body 1 which is mounted upon vehicle axle structures 2 through the intermediation of the pneumatic cushion structures of my invention, and the vehicle may be equipped with wheels 3 having solid cushion tires 4. Four abutment pins 5 are carried by and project upwardly from the axle structures 2 near the axle ends and four abutment pins 6, which are normally in substantially vertical alinement with the pins 5, are carried by and depend from the vehicle body. The pins of each pair of vertically alined pins 5, 6 are received within the cavities or seats afforded by the cupped portions of rigid abutments 7, the alined abutments 7 of each pair being symmetrically arranged in correspondence to the symmetrical arrangement of the corresponding pins 5, 6.

Each abutment 7 is in the form of a disk with its central portion depressed to form a cylindrical cup, the cups of each pair of abutments 7 projecting within hollow resilient pneumatic cushion elements 8 made preferably of rubber composition as a suitably yielding material and partaking generally of the form of a globe, when not under stress. There are thus two cushion elements 8 which are symmetrically arranged and are normally in substantial vertical alinement, and the polar portion of each cushion is penetrated by the cup portion of the corresponding abutment 7. Each such cup portion is exteriorly threaded to receive a clamping nut 9, the polar end of a cushion being received between the nut 9 and the plate or flange of the corresponding abutment 7. The ends of each pair of cushions opposite their polar ends are held fixedly apart preferably by a structure comprising an inner cylinder 10 outwardly flared at its ends and an outer cylinder 11 co-axial with cylinder 10 and made in three alined parts the two lower ones of which are in threaded engagement, the middle part being turned to secure the clamping action. The inner ends of the cushions of a pair are received within the space that is afforded between the cylinders, the outer cylinder being initially shortened for the purpose of thus receiving the inner ends of the cushions between the cylinders, whereafter the middle section of this outer cylinder is turned to lengthen such cylinder whereupon the inner ends of the cushions are fixedly held by the pressure which the outer cylinder exerts upon the inner cylinder through the interposed cushion rims. This clamping pressure upon the cushion rims is exerted both longitudinally and transversely of the cylinders or spacers 10 and 11 by having the diameters of the flanges at the ends of cylinder 10 only slightly less than the diameter of the bore of the cylinder 11. The inner ends of the cushions are desirably thickened or beaded as illustrated so as to conform to the space jointly shaped by the ends of the cylinders 10 and 11 and whereby the desired clamping action is better attained. Those of a pair of cushion structures upon each side of the vehicle are connected by a pipe 12 which may be flexible, this pipe passing through the cylinders 10 and 11 near their upper ends. A nipple 13 is connected with a middle portion of the pipe 12, this nipple being adapted for connection with an air pump which thus may simultaneously supply both cushion structures with air under pressure. When the air pump is disconnected the nipple 13 is closed but the pipe 12 remains in connection with both of its associate cushions for equalization.

The flanged portions of the abutments 7 constitute the abutments proper as these portions directly occasion the compression of the resilient compartments 8, the compartment engaging surfaces of these abutments being so limited in extent as to permit of the total inclusion of the abutments, within the spaces that may be confined by the compartments when distended. By this arrangement the walls of the upper compartments are adapted to project clearly above the upper abutments and the walls of the lower compartments are adapted clearly to overhang the lower abutments when these compartments are subjected to sufficient compression. As the compression of the compartments progresses these increasing portions which project above and overhang the respective abutments serve, in effect, to supplement and widen the resistance at the abutments. In Fig. 5 a series of concentric dotted circles diagrammatically illustrate the peripheries of the folds of the lower compartment taken in the plane of the lower abutment, these peripheries increasing as the compression increases, these dotted circles serving to indicate the widening base at the lower compartment where overhanging the lower abutment. A similar condition exists in connection with the upper compartment and its abutment. The nature of such folds is clearly indicated in Fig. 4 under one degree of compression of the resilient compartments. The distance preserver also operates to prevent the enlargement of adjacent portions of the compartments.

The pins 6 desirably have engagement with the cushion structures materially above the center of gravity of the vehicle body so that such body may have a cradle suspension, whereby stable equilibrium is afforded for the vehicle body, a condition which might not be present, particularly with pneumatic cushions, if the vehicle body were engaged with the cushion structures below its center of gravity. Outsetting overhanging portions of the body have engagement with the cushion structures for this purpose.

Reference may be had to my co-pending application Serial No. 710,585, filed July 20, 1912.

While I have herein shown and particularly described the preferred embodiment of my invention I do not wish to be limited to the precise details of construction shown as changes may readily be made without departing from the spirit of my invention.

Having thus described my invention I claim as new and desire to secure by Letters Patent the following:—

1. A pneumatic cushion structure including a pair of alined truncated globular compartments; and a distance preserver interposed between and affording communication between said compartments, said distance preserver including a member interposed between and entering the globular compartments where truncated and there being outwardly flared, and external clamping means engaging the globular compartments, where truncated, and forcing these compartments where truncated into engagement with the flared portions of the distance preserver.

2. A pneumatic cushion structure including a pair of alined compartments; and a distance preserver interposed between and affording communication between said compartments, said distance preserver including a member interposed between and entering adjacent portions of the compartments and there being outwardly flared, and external clamping means for forcing these compartments where engaged by the flared portions of the distance preserver into engagement with such flared portions.

In witness whereof, I hereunto subscribe my name this twenty-seventh day of January A. D., 1913.

HERBERT F. RUDD.

Witnesses:
G. L. CRAGG,
E. L. WHITE.